United States Patent [19]

Lee, Jr.

[11] 4,309,514

[45] Jan. 5, 1982

[54] MOLDING COMPOSITIONS COMPRISING POLYPHENYLENE ETHER AND HYDROGENATED RADIAL BLOCK COPOLYMER OF VINYL AROMATIC COMPOUND AND DIENE RUBBER

[75] Inventor: Gim F. Lee, Jr., Albany, N.Y.

[73] Assignee: General Electric Company, Pittsfield, Mass.

[21] Appl. No.: 98,784

[22] Filed: Nov. 30, 1979

[51] Int. Cl.³ .................... C08L 71/04; C08L 53/02
[52] U.S. Cl. ........................................ 525/92; 525/901
[58] Field of Search .................................. 525/92, 901

[56] References Cited

U.S. PATENT DOCUMENTS

| 3,257,357 | 6/1966 | Stamatoff | 260/47 |
|---|---|---|---|
| 3,257,358 | 6/1966 | Stamatoff | 260/47 |
| 3,281,383 | 10/1966 | Zelinski et al. | 260/23.7 |
| 3,306,874 | 2/1967 | Hay | 260/47 |
| 3,306,875 | 2/1967 | Hay | 260/47 |
| 3,383,435 | 5/1968 | Cizek | 525/92 |
| 3,696,088 | 10/1972 | DeVault | 260/85.1 |
| 4,077,934 | 3/1978 | Lee | 260/30.6 R |
| 4,080,403 | 3/1978 | Gergen | 525/92 |
| 4,123,410 | 10/1978 | Lee | 525/92 |
| 4,139,574 | 2/1979 | Cooper et al. | 525/92 |
| 4,143,095 | 3/1979 | Lee | 525/92 |
| 4,166,055 | 8/1979 | Lee | 260/30.6 R |
| 4,167,507 | 9/1979 | Haaf | 260/42.47 |

OTHER PUBLICATIONS

Marrs et al., New Contact Cements Based on Radial Block Bis-Adhesive Age, Dec. 1971, pp. 15-20.
Haws et al., Compounding Radial Block Polymers-Rubber World, Jan. 73, pp. 27-32.

*Primary Examiner*—Carman J. Seccuro
*Attorney, Agent, or Firm*—Hedman, Casella, Gibson & Costigan

[57] ABSTRACT

Thermoplastic molding compositions containing polyphenylene ether as the principal structural polymer provide moldings of superior processability and high impact resistance when they contain a minor amount of a selectively hydrogenated radial teleblock copolymer comprising vinyl aromatic compound blocks and saturated rubber blocks.

6 Claims, No Drawings

MOLDING COMPOSITIONS COMPRISING POLYPHENYLENE ETHER AND HYDROGENATED RADIAL BLOCK COPOLYMER OF VINYL AROMATIC COMPOUND AND DIENE RUBBER

This invention relates to thermoplastic molding compositions which consist essentially of polyphenylene ether as the principal polymeric component and a selectively hydrogenated radial teleblock copolymer of a vinyl aromatic compound and a rubber.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers is improved.

It is also known from copending, commonly assigned U.S. patent application Ser. No. 9,791 filed Feb. 6, 1979, that compositions prepared from a polyphenylene ether, a styrene resin and a hydrogenated radial teleblock copolymer of a vinyl aromatic compound and a saturated rubber provide molded articles of improved surface gloss.

Attempts to modify polyphenylene ether alone with radial teleblock copolymers of vinyl aromatic compounds and unsaturated rubber compounds have been unsuccessful because of serious thermal degradation at elevated processing temperatures. This has been overcome in one way by adding a processing aid, such as the mineral oils, phosphate plasticizers, phthalate plasticizers, etc., as generally suggested in Lee, Jr. U.S. Pat. No. 4,077,934. The contents of the foregoing patents and applications are incorporated herein by reference. Such process aids sometimes have a tendency to lower the ultimate physical properties of articles molded from the compositions.

It has now been discovered that selectively hydrogenated radial teleblock copolymers of vinyl aromatic compounds and saturated rubber can be processed with polyphenylene ether to give high impact compositions, without the need to employ styrene resins and/or plasticizing processing aids. The processability of the polyphenylene ether is markedly improved. The new compositions can be modified with conventional additives for thermoplastics, such as pigments, flame-retardants, anti-oxidants, fillers, reinforcements, and the like.

DESCRIPTION OF THE INVENTION

According to the present invention, there are provided thermoplastic molding compositions which comprise an intimate admixture of resinous components consisting essentially of:

(a) a polyphenylene ether resin; and (b) a hydrogenated radial teleblock copolymer comprising a vinyl aromatic compound, a saturated rubber and a coupling agent.

The polyphenylene ethers (also termed polyphenylene oxides and "PPO") are known as a class (see Hay and Stamatoff, U.S. Patents above-mentioned). They are composed essentially of repeating units having the theoretical formula:

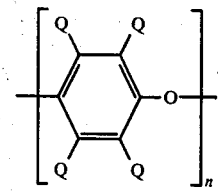

wherein the oxygen ether atom of one unit is connected to the benzene nucleus of the next repeating unit, n is a positive integer and is at least 50, and each Q is a monovalent substituent selected from the group consisting of hydrogen, halogen, hydrocarbon radicals free of a tertiary α-carbon atom, halohydrocarbon radicals having at least two carbon atoms between the halogen atom and phenyl nucleus and being free of a tertiary α-carbon atom, hydrocarbonoxy radicals being free of a tertiary α-carbon atom, and halohydrocarbonoxy radicals having at least 2 carbon atoms between the halogen atom and phenyl nucleus and being free of a tertiary α-carbon atom. The polymer can contain minor percentages of other units so long as those units do not significantly affect the essential character of the polymer.

Examples of suitable polymers in this group are disclosed in the above-identified patents and additional suitable polyphenylene ethers can be prepared in accordance with the methods shown there. Poly-(2,6-di $C_1$–$C_4$ alkyl-1,4-phenylene) ethers are preferred and poly-(2,6-dimethyl-1,4-phenylene) ether is especially preferred.

The term "hydrogenated radical teleblock copolymer" refers to branched polymers having segments, or blocks, which are comprised of a saturated rubber, blocks of a vinyl aromatic polymer, and a coupling agent. More particularly, in the copolymer structure, several chains of the rubber, usually two or more, extend from a coupling agent, with each chain terminating at its other end with a block of the vinyl aromatic polymer.

Radial teleblock copolymers are known in the art. For instance, detailed description of these materials are given by Marrs et al. in ADHESIVES AGE, Dec. 1971, pp. 15–20 and by Haws et al. in RUBBER WORLD, Jan. 1973, pp. 27–32, the disclosures of which are incorporated herein by reference.

Radial teleblock copolymers are available commercially or can be prepared by following the teachings of the prior art. As an illustration, they can be made by polymerizing conjugated dienes, e.g., butadiene, and vinyl aromatic compounds, e.g., styrene in the presence of an organometallic initiator, e.g., n-butyllithium, to produce copolymers which contain an active metal atom, such as lithium, on one end of each of the polymer chains. These metal atom-terminated polymers are then reacted with a coupling agent which has at least two active sites capable of reacting with the carbon-metal atom bonds on the polymer chains and replacing the metal atoms on the chains. This results in polymers which have relatively long branches which radiate from a nucleus formed by the poly-functional coupling agent. Such a method of preparation is described in detail in Zelinski et al., U.S. Pat. No. 3,281,383, which is incorporated herein by reference.

The coupling agents for radial teleblock copolymers can be chosen from among polyepoxides, polyisocyanates, polyimines, polyaldehydes, polyketones, polyanhydrides, polyesters, polyhalides, and the like. These materials can contain two or more types of functional groups, such as the combination of epoxy and aldehyde groups or isocyanate and halide groups. The coupling agents are described in detail in the above-mentioned U.S. Pat. No. 3,281,383.

The conjugated dienes of radial teleblock copolymers include compounds such as 1,3-butadiene, isoprene, 2,3-dimethyl-1,3-butadiene, 1,3-pentadiene, 3-butyl-1,3-octadiene, and the like.

The vinyl aromatic compounds include styrene, 1-vinylnaphthalene, 2-vinylnaphthalene, and the alkyl, cycloalkyl, aryl, alkaryl, and aralkyl derivatives thereof. Examples include 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, and the like.

Hydrogenation of radial teleblock copolymers to form the hydrogenated radial teleblock copolymers (b) is known in the art and can be carried out by any of several known procedures. See by way of illustration DeVault, U.S. Pat. No. 3,696,088, which is incorporated herein by reference.

In preferred compositions, the hydrogenated radial teleblock copolymer will be a radial teleblock copolymer of styrene and a saturated rubber, with terminal blocks derived from styrene, and a coupling agent selected from epoxidized polybutadiene, SiCl$_4$, polyisocyanates, polyaldehydes, polyhalogen substituted hydrocarbons such as 1,3-5-tri(bromoethyl)benzene or 2,5,6,9-tetrachloro-3,7-decadiene, or mixtures thereof. Especially preferred epoxidized polybutadiene coupling agents are available commercially under the tradenames Oxiron 2000 and Oxiron 2001 from Food Machinery Corporation. Coupling agents are discussed in U.S. Pat. No. 3,281,383, incorporated herein by reference.

The molecular weight of the hydrogenated radial teleblock copolymer and the ratios of the co-monomers thereof can vary broadly. In preferred embodiments the molecular weight of the hydrogenated radial teleblock copolymer will be from about 50,000 to about 350,000, and will comprise from 1 to 45 parts by weight of the vinyl aromatic compound and from 99 to 55 parts by weight of the saturated rubber, based on the weight of the radial teleblock copolymer. The amount of coupling agent in the copolymer will depend on the particular agent and the amount of organo-metallic initiator used. Generally, relatively small amounts of coupling agent, e.g., from 0.02 to 1 part by weight per 100 parts of resin are employed.

Preferred hydrogenated radial teleblock copolymers include Solprene 502 and 512 (containing about 70 parts by weight of hydrogenated butadiene units and about 30 parts by weight of styrene units), which are available commercially from Phillips Petroleum Co., Stowe, Ohio. These materials also include a relatively minor amount of a coupling agent, e.g., less than 1 part by weight of a coupling agent per 100 parts by weight of copolymer.

The precise amount of the teleblock copolymer which is admixed with the polyphenylene ether according to the present invention varies from instance to instance depending chiefly on the particular polyphenylene ether (or mixture of polyphenylene ethers) which is present, the particular teleblock polymer (or mixture of teleblock polymers) which is employed, the molecular weights of the respective polymers, and the amount of improvement in impact resistance which is desired. A suitable amount in any instance, however, can be ascertained by making a series of trials following the procedure shown in the examples below. In general, satisfactory improvements in impact resistance are obtained when the weight ratio of the polyphenylene ether to the teleblock copolymer is in the range of 99:1 to 50:50, and best improvements are generally obtained within the range of 60:40 to 80:20, which is therefore preferred.

The compositions of the invention can also include other ingredients, such as flame retardants, extenders, processing aids, pigments, stabilizers, fillers such as mineral fillers and glass flakes and fibers, and the like. In particular, reinforcing fillers, in amounts sufficient to impact reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus, and the tensile strength.

The compositions of the present invention can be prepared by customary methods. For example, the resins, and any additives, are first dry mixed, then passed through the extruder at elevated temperature, e.g., 450°-650° F., then chopping the extrudate into granules.

DESCRIPTION OF THE PREFERRED EMBODIMENTS

The invention is further described in the examples which follow. These examples are preferred embodiments of the invention, and are not to be construed in limitation thereof.

EXAMPLES 1-2

Compositions according to this invention are prepared by dry mixing the components to make a preblend, and then feeding the preblend to a 28 mm. Werner-Pfleiderer extruder at 550° F., and finally chopping the exturdate into pellets. The pellets are injection molded into test samples in a 3 oz. Newbury machine at 550° F. (cylinder) and 190° F. (mold). The results are set forth in the Table:

TABLE

Compositions Comprising Polyphenylene Ether and Hydrogenated Radial Teleblock Copolymer

| Example | 1 | 2 |
|---|---|---|
| Composition (Parts by Weight) | | |
| Poly(2,6-dimethyl-1,4-phenylene)ether[a] | 60 | 80 |
| Selectively hydrogenated radial teleblock copolymer of styrene and butadiene rubber[b] | 40 | 20 |
| Properties | | |
| Tensile yield strength, psi | 3,500 | 9,130 |
| Tensile break strength, psi | 5,100 | 9,130 |

TABLE-continued

| Compositions Comprising Polyphenylene Ether and Hydrogenated Radial Teleblock Copolymer | | |
|---|---|---|
| Example | 1 | 2 |
| Elongation, % | 70 | 36 |
| Izod impact strength, ft.-lbs./in. notch | 10.2 | 15.9 |

[a] General Electric Company, PPO [b] Phillips Chemical Co., Solprene 502

The impact strength of the compositions is especially noteworthy.

Obviously, many variations will suggest themselves to those skilled in this art in light of the above, detailed description. All such obvious variations are within the full intended scope of the appended claims.

I claim:

1. A thermoplastic molding composition which comprises an intimate admixture of resinous components consisting essentially of:
   (a) a polyphenylene ether resin; and
   (b) a hydrogenated radial teleblock copolymer comprising a vinyl aromatic compound, a saturated diene rubber and a coupling agent, said polyphenylene ether and said teleblock copolymer copolymer being present in a weight ratio of 99:1 to 50:50.

2. A composition according to claim 1, wherein the polyphenylene ether is poly-(2,4-dimethyl-1,4-phenylene) ether.

3. A composition according to claim 1, wherein the blocks of vinyl aromatic compound units and the blocks of saturated rubber units are present in weight ratio of 50:50 to 10:90 in said copolymer.

4. A composition according to claim 3, wherein the blocks of vinyl aromatic compound units and the blocks of saturated rubber units are present in weight ratio of about 30:70.

5. A composition according to claim 1, wherein said vinyl aromatic compound is styrene and said saturated rubber units are saturated butadiene units.

6. A composition according to claim 1, wherein said polyphenylene ether and said teleblock copolymer are present in weight ratio of 60:40 to 80:20.

* * * * *